(12) United States Patent
Koch-Groeber

(10) Patent No.: US 6,517,047 B2
(45) Date of Patent: Feb. 11, 2003

(54) CONTROL VALVE FOR A FUEL INJECTION NOZZLE

(75) Inventor: Hermann Koch-Groeber, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/790,489

(22) Filed: Feb. 23, 2001

(65) Prior Publication Data

US 2001/0017359 A1 Aug. 30, 2001

(30) Foreign Application Priority Data

Feb. 25, 2000 (DE) .......................... 100 09 037

(51) Int. Cl.⁷ .............................................. F16K 31/02
(52) U.S. Cl. .............................. 251/129.16; 239/585.1; 239/585.3; 239/900
(58) Field of Search .................. 251/129.16; 239/585.1, 239/585.2, 585.3, 900

(56) References Cited

U.S. PATENT DOCUMENTS

| | | | |
|---|---|---|---|
| 4,474,332 A | * 10/1984 | Kaska | 239/585.3 |
| 4,585,174 A | * 4/1986 | Knapp | 239/585.1 |
| 4,982,902 A | * 1/1991 | Knapp et al. | 251/129.16 |
| 5,236,173 A | * 8/1993 | Wakeman | 239/585.3 |
| 5,299,776 A | * 4/1994 | Brinn et al. | 239/585.3 |
| 5,476,245 A | * 12/1995 | Augustin | 251/129.16 |
| 5,727,525 A | 3/1998 | Tsuzuki | |

FOREIGN PATENT DOCUMENTS

| | | |
|---|---|---|
| EP | 0588475 A2 | 7/1993 |
| GB | 1475338 | 6/1977 |
| GB | 2250863 A | 6/1992 |
| GB | 2332477 A | 6/1999 |

* cited by examiner

Primary Examiner—Henry C. Yuen
Assistant Examiner—John Bastianelli
(74) Attorney, Agent, or Firm—Ronald E. Greigg

(57) ABSTRACT

A control valve for a fuel injection nozzle, having a control chamber, into which a fluid conduit discharges, and a valve element, which rests on a valve seat in the control chamber, so that the fluid conduit is closed. An armature plate, which is disposed in a damping chamber and has a pressure piece that cooperates with the valve element, and an armature coil. The armature, formed by the pressure piece and the armature plate is prevented from bouncing in response to a closing motion. For that purpose, an overflow conduit is provided between the control chamber and the damping chamber.

22 Claims, 1 Drawing Sheet

CONTROL VALVE FOR A FUEL INJECTION NOZZLE

BACKGROUND OF THE INVENTION

The invention relates to a control valve for a fuel injection nozzle, having a control chamber with a valve seat, into which a fluid conduit discharges. A valve element, which rests on the valve seat in the control chamber, so that the fluid conduit is closed. An armature plate, which is disposed in a damping chamber and has a pressure piece that cooperates with the valve element, and having an armature coil.

A control valve of this kind is used in a fuel injection nozzle, for example for a common rail system for diesel engines, to control the opening and closing of the nozzle needle of the injection nozzle. The fluid conduit discharges into the control chamber and leads to a pressure chamber, which is closed on one side by the nozzle needle or by a component connected to the nozzle needle. When the valve element of the control valve is closed, no fluid can escape from the pressure chamber via the fluid conduit, so that the fluid is backed up in the pressure chamber. As a result, an adequately high pressure in the pressure chamber keeps the nozzle needle in the closed position. Conversely, when the valve element lifts from the valve seat, the backed-up fluid escapes from the pressure chamber through the fluid conduit and the control chamber of the control valve, the pressure in the pressure chamber drops, and as a result, the nozzle needle, under the influence of the fuel pressure applied to an upstream end of the nozzle needle, is lifted from its nozzle needle valve seat. Fuel can now be injected into a cylinder of an engine.

To enable controlling the injection event with the requisite speed, fast switching of the control valve is desirable. The chronological spacing between two injection events, for instance between a preinjection and the subsequent main injection, is defined by the length of time that the armature of the control valve, comprising the armature plate and the pressure piece, requires to return to a standstill after a closing motion, or in other words after the closing motion has pressed the valve element against the valve seat. Since in fact the armature, toward the end of the closing motion, abruptly strikes the valve element or a similar stop, the result can be a bouncing of the armature, which is disadvantageous for the next triggering of the control valve. To prevent the bouncing and to reduce the length of time that the armature needs to return to a standstill, it is for instance known from the prior art to embody the pressure piece and the armature plate separately, and to use a spring to decouple the pressure piece from the armature plate in a suitable way. However, the armature plate, which can vibrate in the closing motion and does not come to a standstill until after a certain calming time, still remains.

OBJECT AND SUMMARY OF THE INVENTION

An object of the invention is to further develop a control valve of the type defined at the outset such that shorter switching times are possible.

A control valve according to the invention leads to a controlled braking of the closing motion of the armature, thus overcoming the risk of bouncing. It is thus no longer necessary to embody the pressure piece and the armature plate separately from one another, and the result is accordingly a simplified and hence more economical construction. The functional reliability is also enhanced, since the armature and plate, now in the form of a one-piece component, is more stable.

The invention will be better understood and further objects and advantages thereof will become more apparent from the ensuing detailed description of preferred embodiments taken in conjunction with the drawing.

DESCRIPTION OF THE PREFERRED EMBODIMENTS

Figure 1:
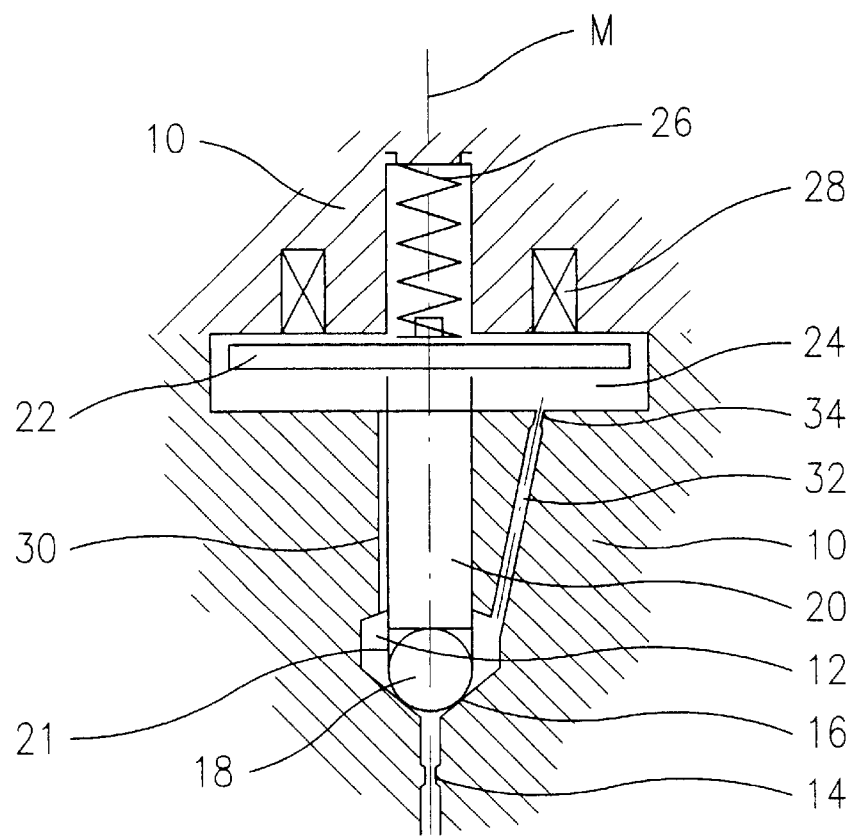
FIG. 1 is a schematic sectional view of a control valve of the invention, showing a first embodiment on the left-hand side and second embodiment on the right-hand side.

In FIG. 1, in a schematic section, a control valve according to the invention is shown; a first embodiment is shown on the left-hand side of the center axis M, and a second embodiment is shown on the right-hand side of this axis M.

The control valve has a body 10, in which a control chamber 12 is formed. Discharging into this chamber is a fluid conduit 14, which leads to a pressure chamber (not shown) of an injection valve actuated by the control valve. A valve seat 16 is embodied around the fluid conduit 14 in the control chamber 12, and a valve element 18 in the form of a valve ball can rest on this valve seat. A pressure piece 20, which together with an armature plate 22 forms the armature of the control valve, rests on the valve element 18, on the side remote from the valve seat 16. The pressure piece 20 is provided with a guide 21, which holds the valve element 18 in a displaceably manner. Alternatively, the valve element 18 could be held in self-centering fashion in the valve seat 16 or could be embodied in one piece with the pressure piece.

The armature plate 22 is disposed in a damping chamber 24 in the body of the control valve. On the side of the armature plate 22 remote from the pressure piece 20, there is a compression spring 26, which urges the armature and thus the valve element 18 against the valve seat 16. Finally, an armature coil 28 is disposed in the body 10; by means of this coil, the armature plate 22 can be transferred from the position shown in FIG. 1, in which the valve element 18 closes the fluid conduit 14, into an open position, in which the fluid conduit 14 is opened. From the damping chamber 24, a return line (not shown) leads to the fuel return, in order to return the fluid, flowing through the pressure chamber of the injection valve and through the fluid conduit 14, to the fuel return.

The control chamber 12 communicates with the damping chamber 24 through an overflow conduit, which in the embodiment shown on the left in FIG. 1 is formed by an annular gap 30 between the pressure piece 20 and its guide in the body 10. Alternatively, instead of the annular gap, a groove in the guide could be used. In the embodiment shown on the right in FIG. 1, the overflow conduit is formed by a separate bore 32 in the body 10, which bore is provided with a throttle 34.

The mode of operation of the control valve described is as follows: When the fluid conduit 14 is to be opened, the armature coil 28 is excited, so that the armature plate 22 is attracted by a magnetic field formed by the coil 28. As a result, the pressure piece 20 moves away from the valve seat 16, counter to the action of the compression spring 26, so that the valve element 18 can lift away from the valve seat 16. The pressurized fluid flowing into the control chamber 12 increases the pressure in the control chamber 12, which reinforces the opening motion of the pressure piece 20.

Figure 2:
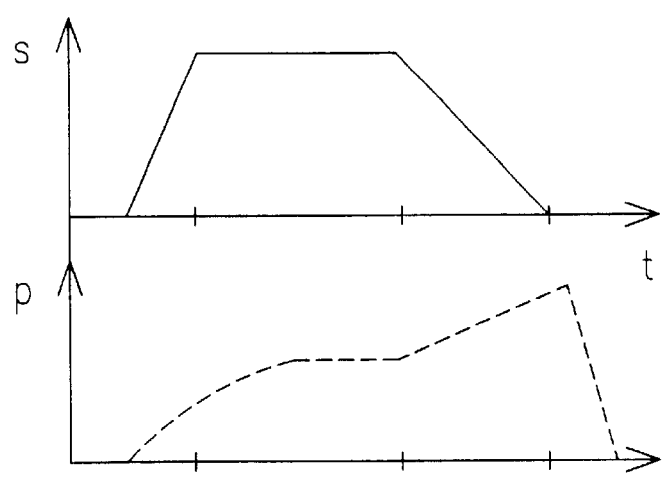
FIG. 2 shows two diagrams of the parameters of stroke and pressure of a control valve of the invention.

The pressure that builds up in the control chamber 12 upon opening of the valve element 18 can be seen in FIG. 2, in which both the stroke of the pressure piece 20 and the pressure in the control chamber 12 are plotted over time.

To close the fluid conduit 14 again the coil is not excited and the armature plate 22 is uncovered. As a result, the pressure piece 20 is urged toward the valve seat 16 under the influence of the compression spring 26, and this closing motion of the pressure piece counteracts the pressure prevailing in the control chamber 12. The fluid now positively displaced out of the control chamber 12 through the annular gap 30 or the bore 32 and the throttle restriction 34 assures a controlled, braked closing motion of the armature into a position in which the valve element 18 is pressed against the valve seat 16. Bouncing of the armature is thereby averted. The braking motion counteracting the closing motion of the armature can be varied by means of a suitable design of the annular gap 30 or bore 32 and throttle restriction 34 and by the choice of the cross-sectional area of the pressure piece 20, by the stroke, and also by the seat geometry and the volume of the control chamber 12.

In addition to the advantages named above, which result from the now one-piece embodiment of the armature, the advantage is obtained that the demands made of the magnet system formed by the armature plate and the armature coil are lessened, since the pressure operative in the control chamber 12 upon opening speeds up the opening operation. Thus, an armature plate of a solid material, for instance, can now be used.

The foregoing relates to preferred exemplary embodiments of the invention, it being understood that other variants and embodiments thereof are possible within the spirit and scope of the invention, the latter being defined by the appended claims.

I claim:

1. A control valve for a fuel injection nozzle, comprising a control chamber (12), into which a fluid conduit (14) discharges, a valve element (18), which rests on a valve seat (16) in the control chamber, so that the fluid conduit is closed, an armature plate (22), which is disposed in a damping chamber (24), said armature plate (22) is integral with a pressure piece (20) that cooperates with the valve element, and having an armature coil (28) which acts upon said armature plate when excited, and between the control chamber (12) and the damping chamber, an overflow conduit (30, 32, 34) is provided, there being no other outlet from the control chamber (12), and the overflow conduit having means to restrict the flow there through, so (12) and through the overflow conduit (30, 32, 34) by the closing of the valve element (18) against the valve seat (16) causes damping of the valve element (18).

2. The control valve according to claim 1, in which the overflow conduit is formed by an annular gap (30) around the pressure piece (20).

3. The control valve according to claim 1, in which the overflow conduit is formed by a separate bore (32, 34) in the body (10) of the control valve.

4. The control valve according to claim 3, in which the separate bore is provided with a throttle restriction (34).

5. The control valve according to claim 1, in which the pressure piece (20) is provided with a guide (21) for the valve element.

6. The control valve according to claim 2, in which the pressure piece (20) is provided with a guide (21) for the valve element.

7. The control valve according to claim 3, in which the pressure piece (20) is provided with a guide (21) for the valve element.

8. The control valve according to claim 4, in which the pressure piece (20) is provided with a guide (21) for the valve element.

9. The control valve according to claim 1, in which the valve element (18) is a valve ball.

10. The control valve according to claim 2, in which the valve element (18) is a valve ball.

11. The control valve according to claim 3, in which the valve element (18) is a valve ball.

12. The control valve according to claim 4, in which the valve element (18) is a valve ball.

13. The control valve according to claim 5, in which the valve element (18) is a valve ball.

14. The control valve according to claim 1, in which a compression spring (26) is provided, said compression spring urges the pressure piece (20) toward the valve element and the valve seat.

15. The control valve according to claim 2, in which a compression spring (26) is provided, said compression spring urges the pressure piece (20) toward the valve element and the valve seat.

16. The control valve according to claim 3, in which a compression spring (26) is provided, said compression spring urges the pressure piece (20) toward the valve element and the valve seat.

17. The control valve according to claim 4, in which a compression spring (26) is provided, said compression spring urges the pressure piece (20) toward the valve element and the valve seat.

18. The control valve according to claim 5, in which a compression spring (26) is provided, said compression spring urges the pressure piece (20) toward the valve element and the valve seat.

19. The control valve according to claim 9, in which a compression spring (26) is provided, said compression spring urges the pressure piece (20) toward the valve element and the valve seat.

20. The control valve according to claim 1, in which said fluid conduit (14) includes a throttle restriction.

21. The control valve according to claim 3, in which said fluid conduit (14) includes a throttle restriction.

22. The control valve according to claim 4, in which said fluid conduit (14) includes a throttle restriction.

* * * * *